United States Patent [19]
Ziskovsky et al.

[11] Patent Number: 5,392,527
[45] Date of Patent: Feb. 28, 1995

[54] ANNULUS MEASURING DEVICE

[75] Inventors: Joseph R. Ziskovsky; Leslie A. Hassler, both of Shoreview, Minn.

[73] Assignee: Wheelabrator Engineered Systems, Inc., New Brighton, Minn.

[21] Appl. No.: 90,302

[22] Filed: Jul. 12, 1993

[51] Int. Cl.⁶ .................... G01B 5/14; G01B 17/00
[52] U.S. Cl. ........................ 33/542; 33/791; 33/501.03; 33/1 BB
[58] Field of Search ............. 33/1 P, 1 BB, 715, 791, 33/501.02, 501.03, 523, 542, 543, 544, 544.3; 73/592, 598, 622, 623, 629, 635, 638; 367/35, 106, 129, 130

[56] References Cited

U.S. PATENT DOCUMENTS

| | | | |
|---|---|---|---|
| 1,895,643 | 1/1933 | Putnam | 33/544.3 |
| 2,596,023 | 5/1952 | Goble et al. | 33/544 |
| 2,631,270 | 3/1953 | Goble | 33/715 |
| 3,028,752 | 4/1962 | Bacon | 73/67.8 |
| 3,495,340 | 2/1970 | Bunnell | 33/523 |
| 3,809,607 | 5/1974 | Murray et al. | 176/19 R |
| 3,868,847 | 3/1975 | Gunkel | 73/67.8 S |
| 3,960,006 | 6/1976 | Smith | 73/67.8 S |
| 4,087,918 | 5/1978 | Schmid et al. | 33/542 |
| 4,199,258 | 4/1980 | Dau | 33/544.3 |
| 4,212,207 | 7/1980 | Condradi | 73/623 |
| 4,218,923 | 8/1980 | Triplett et al. | 73/623 |
| 4,361,044 | 11/1982 | Kupperman et al. | 73/623 |
| 4,487,072 | 12/1984 | Livingston | 73/622 |
| 4,489,495 | 12/1984 | Scheinecker | 33/501.03 |
| 4,569,230 | 2/1986 | Asty et al. | 73/623 |
| 4,586,380 | 5/1986 | Patterson | 73/623 |
| 4,651,437 | 3/1987 | Al-Khouly | 33/544.3 |
| 4,967,149 | 12/1990 | Ichikawa et al. | 73/597 |
| 5,156,636 | 10/1992 | Kuljis | 73/597 |

FOREIGN PATENT DOCUMENTS

| | | | |
|---|---|---|---|
| 0076553 | 4/1983 | European Pat. Off. | 73/622 |
| 0231260 | 9/1988 | Japan | 73/622 |
| 0229904 | 9/1989 | Japan | 33/544 |
| 1675651 | 9/1991 | U.S.S.R. | 33/542 |

OTHER PUBLICATIONS

No month 1989 "Ultrasonic Arrays The Dimensional Inspector" Ultrasonic Arrays, Inc. 18612 142nd Ave., N.E., Woodlinville, Wash. 98072.

*Primary Examiner*—Thomas B. Will
*Attorney, Agent, or Firm*—Barry L. Clark

[57] ABSTRACT

Measuring device for quickly and accurately determining the thickness of an annulus between two cylindrical members, such as the catalyst retaining screens of a radial flow reactor, at any point along its length or circumference, comprises a wheeled cart having two sets of angularly mounted wheels which straddle the inner screen and a pair of spring loaded plungers with ball shaped contacts which contact the outer screen. As the device is lowered into an annulus with a cable, a pair of ultrasonic transducers positioned inside the cart direct opposed beams radially of the annulus to permit the radial distance between the screens to be measured.

12 Claims, 3 Drawing Sheets

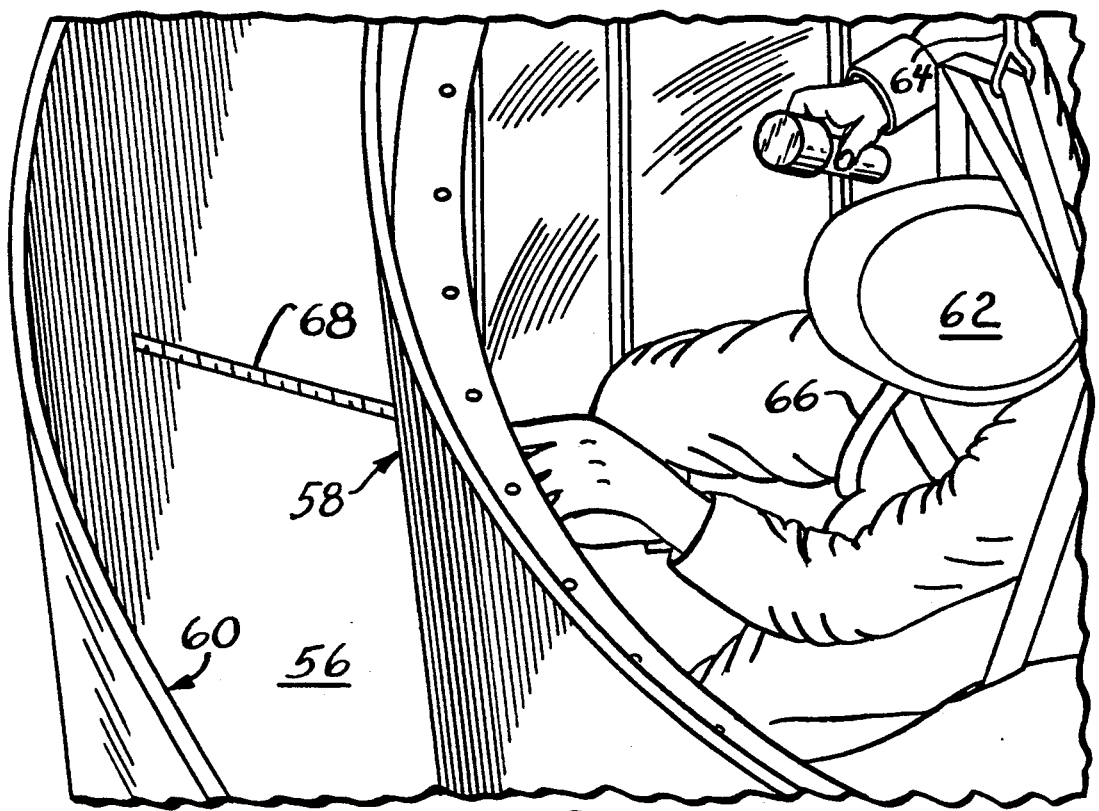
FIG. 2 PRIOR ART
FIG. 3
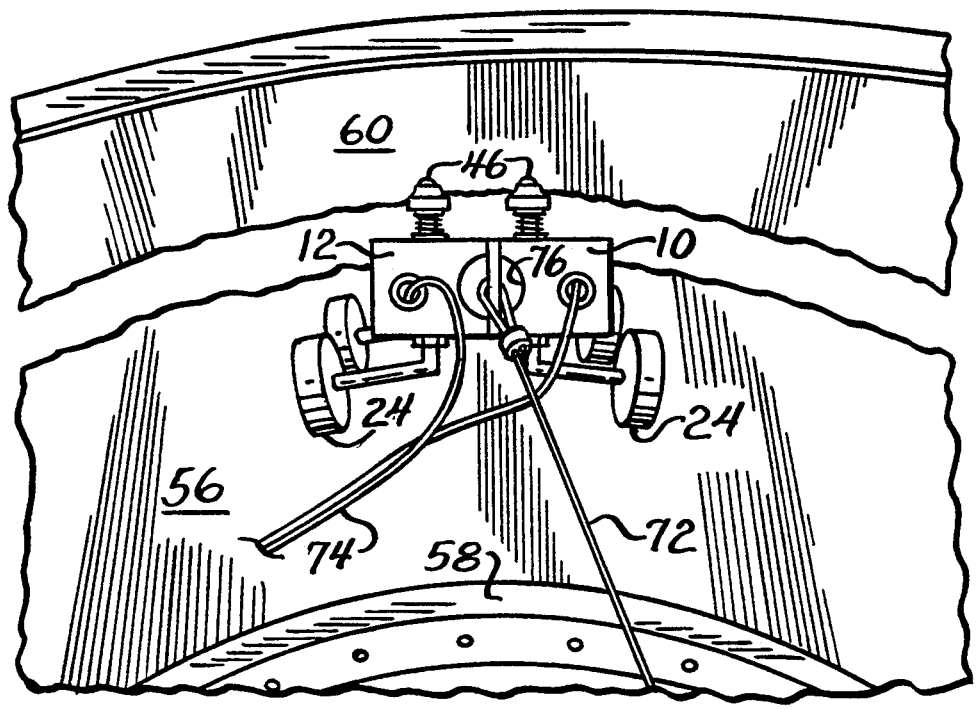

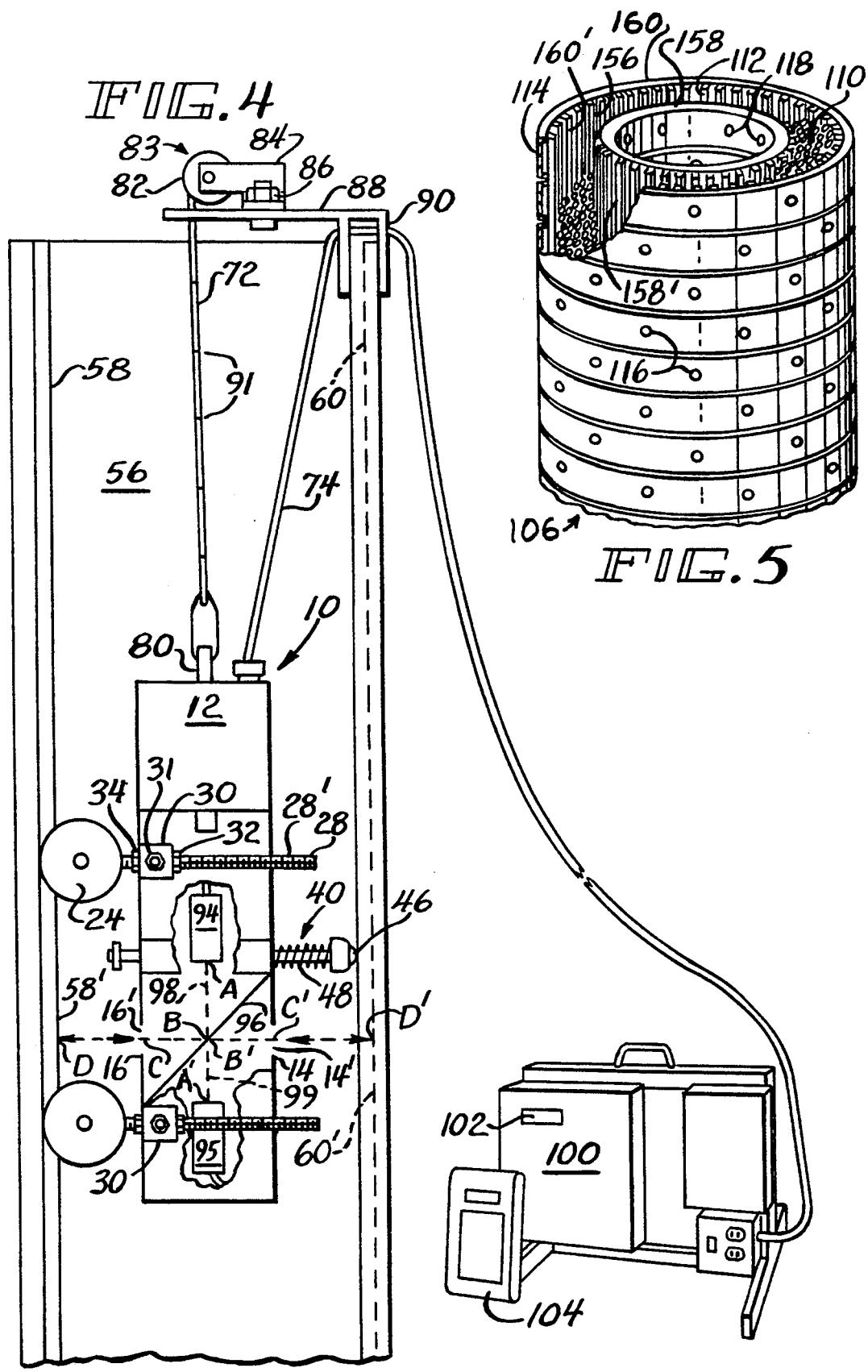

ANNULUS MEASURING DEVICE

BACKGROUND OF THE INVENTION

This invention relates to a device for measuring the distance between a pair of walls, and particularly to a device for measuring the radial distance between a pair of co-axial cylindrical walls which are spaced apart by an open annular area, or annulus. An example of a structure which includes such an annulus is a radial flow reactor of the moving bed type used in the petrochemical industry. Typically, such a reactor might include an assembly of two vertically positioned concentric cylindrical screens which are about 8–12 meters high and made of stacked tiers, each tier being about 2 meters high and formed of three or more curved panel segments which are welded together. The inner screen might have an outer diameter of about 1.8–2.4 meters and be separated from the outer screen by an annulus having a radial dimension of about 15–33 cm. In use, the annulus would be filled with catalyst pellets which are typically a ceramic substrate which is coated with a costly material, such as platinum. The catalyst pellets form a bed, through which a gas to be treated would typically pass in its path from an annular chamber outside the screen assembly to a hollow chamber within the inner screen. In order to ensure uniform treatment of the gas passing through the catalyst bed, it is essential that the annulus, and thus the catalyst bed, have a predetermined minimum thickness, and preferably be of a uniform thickness. If one region is of substantially less thickness than another, it will present less resistance to flow and thus result in less contact time between the gas and the catalyst in the particular region. It would also cause an overall increase in gas flow through the affected region which could possibly cause "hot spots" to be created in the bed and a deterioration of the catalyst if the reactor is operated at its highest capacity. Alternatively, to prevent catalyst deterioration and "hot spots", a reactor having a non-uniform annulus could be operated at a lower than normal gas flow rate but this would reduce its production capacity. Furthermore, since the catalyst is extremely expensive, it is highly desirable that none be wasted by having some portions of the annulus wider than other portions. In order to ensure that the annulus is of the proper minimum and maximum dimension, it is essential that it be measured prior to the installation of catalyst. Measurements are typically required to be taken at about every 30 cm along the length of the screens and at every 45° around their circumference, as well as at the top and bottom of each tier and along every vertical weld seam between segments. Thus, about 500 or so measurements must usually be taken for a screen assembly having a length of about 12 meters. This operation is very tedious, and typically requires at least two workers to each expend 6–8 hours of time. It also necessitates either the erection of scaffolding around the screen assemblies or, more often, the lowering of a worker, suspended by a harness assembly, into the center screen opening. The worker doing the measuring uses a thin metal scale or ruler which he must carefully pass through a slot in the inner screen and, while trying to keep the scale level and aimed perpendicular to the screen, push it into the slot until its end engages the inner surface of the outer screen. At this point, he must take a reading of the distance to the outside screen surface. The series of readings must be carefully noted and a correction factor must later be applied to subtract the thickness of the inner screen wire. Because of the nature of the procedure, it is quite possible for repetitive readings taken by the same or different persons to vary as much as 2 or 3 min.

The measuring operation is usually performed at least several times. Initially when the screen segments are made, when they are fabricated into long sections, and after installation at the job site. If the readings show that the annulus varies from a very tight tolerance, adjustments might be able to be made be changing the angular position of the inside screen relative to the outside screen. More commonly, however, hydraulic jacks are used to selectively adjust the internal diameter of the screen at one or more locations. Obviously, every time such an adjustment is made a new set of readings must be made.

SUMMARY OF THE INVENTION

It is an object of the present invention to provide an annulus measurement device to measure the annular distance between two vertically positioned, generally concentric cylinders, at any point along their length or around their circumference;

It is another object of the invention to measure the annular distance between two vertically positioned, generally concentric, cylinders in a manner that is fast, accurate and repeatable;

It is a further object of the invention to provide an annulus measurement device which is adjustable so that it is capable of measuring a considerable range of annular distances between two concentric cylinders;

It is yet another object of the invention to provide an annulus measurement device which can be freely lowered into the annular space between two cylinders under its own weight and which will move vertically in a generally straight line while contacting the walls of both cylinders; and It is a still further object of the invention to provide an annulus measurement device for continuously measuring the annular distance between a pair of generally concentric cylindrical walls along the length thereof by means of ultrasonic beams wherein means are provided for ensuring that the beams are always directed in a direction normal to each of the opposed walls of the annulus.

These and other objects are achieved by the apparatus of the present invention in which an annulus measurement device is, in a preferred embodiment, provided in the form of a wheeled cart which can be lowered or raised by a lowering or lifting means such as a cable into the annular space defined by an outer and inner surface of each of two generally cylindrical, concentric, tubular-shaped members such as a pair of screens, at any point around the circumference of the screens. The cart has an elongated body portion or housing and at least one spaced-apart set of guide means extending from a first surface thereof for guiding said body portion for vertical movement relative to one of said outer and inner wall surfaces. It also has at least one contact portion extending from an opposed second surface thereof which engages the other of said outer and inner wall surfaces. Resilient means bias the said at least one contact portion and the said at least one spaced-apart set of guide means apart from each other. Distance measuring means are provided on the elongated body portion for generating and directing a pair of sensing beams in opposed directions outwardly relative to said first and second surfaces of said body portion and into contact with said inner and outer wall surfaces in a direction normal thereto. Preferably, the sensing beams are generated by a pair of axially aligned ultrasonic transducers mounted within the opposed ends of the elongated body portion. The beams are directed along the axis of the cart toward each other and into contact with the opposed surfaces of a flat plate which is arranged at a 45° angle to the axis of the transducers which reflects and directs them outwardly of the cart through a pair of opposed openings in said first and second surfaces. The beams are reflected in opposite directions toward said inner and outer wall surfaces and radially of said annulus. Control means associated with the transducers sense the time it takes for the pair of sensing beams to contact the inner and outer wall surfaces and be reflected back to their source and then sum them in order to permit the radial thickness of the annulus to be calculated. A suitable device for this purpose is the "TMS 100" thickness measuring controller manufactured by Ultrasonic Arrays of Woodinville, Wash. To ensure that the transducers and related controller are accurately calibrated, flat plates may be temporarily mounted over each of the opposed openings in the body portion. Since the plates would always be at a fixed distance from each other, the distance measurement made by the unit when the plates are in place should always be constant.

The at least one spaced-apart set of guide means preferably comprise pairs of wheels made of nylon or other low friction material mounted at opposite ends of the cart on individual axles which are adjustably movable to accommodate a relatively wide range of annular thicknesses. The axes of the wheels in each pair are preferably positioned at an angle to each other so that the surfaces of the wheels will be cambered. This cambering ensures that the contact surface of the wheels will be tangent to, and that they will track, the outer convex surface of the inner screen as the cart is lowered. Alternatively, the axes could be aligned if the contact surfaces of the wheels were specially shaped to provide a tangential contact with the outer convex surface of the inner screen. The at least one contact portion preferably comprises a pair of contacts located at the outer ends of a pair of shafts which are mounted on the cart so as to be positioned intermediate the sets of wheels. The shafts are adapted to move longitudinally along their axes in low fiction bearings on each side of the elongated body portion and have contact portions on their outer end in the form of balls made of PTFE or other low fiction material. A spring mounted on each shaft between its bearing and the ball-shaped contact portion causes the contact portion to be resiliently biased outwardly into contact with the convex inner surface of the outer screen. The springs are selected to be sufficiently strong so that they will hold the contact portions and wheels in light contact with the walls of the screens which define the annulus, as the cart is freely lowered. However, they should not be so strong as to overcome the downward gravity force of the cart and allow the wheels of the cart to engage the outer surface of the inner screen so firmly as to cause the cart to track it in a non-vertical direction.

In order to permit the radial dimensions of an annulus to be measured in a uniform manner, the cable by which the measuring device is lowered is preferably marked at intervals along its length. The markings facilitate the taking of readings of o the annular dimension at each interval. The readings could also be taken automatically and recorded as they are taken to provide a permanent record. In a preferred embodiment, a foot switch is actuated by the operator each time a new measuring location is reached, causing the annulus dimension to be displayed and also recorded in a "DataMyte" recorder which is available from DataMyte Corporation of Minnetonka, Minn. The recorded information may then be transferred into a spreadsheet program and printed out in any desired manner. The cable is preferably powered by a motor and mounted on a support bracket which can be easily moved to different angular positions around the annulus.

BRIEF DESCRIPTION OF THE DRAWINGS

FIG. 2 is a partially broken away perspective view illustrating the prior art technique of measuring an annulus between two concentric screens wherein a person who has been lowered by means of a harness assembly into the interior of the center screen takes measurements by placing a thin ruler through the slots of the screen, reads the measurements, and then either writes them down or calls them off to another person who writes them down;

FIG. 3 is a partially broken away perspective view similar to FIG. 2 in that it shows an annulus between two concentric screens which must be measured, but wherein the measurement is accomplished by lowering the measuring device of the present invention through the annulus by means of a cable;

FIG. 4 is a generally schematic side view of a preferred embodiment of the measuring device of the present invention showing its relationship to the screen wall surfaces of an annulus through which it is being lowered and illustrating the paths taken by a pair of ultrasonic beams which are directed toward the inner screen which is engaged by the device's two sets of wheels and the outer screen which is engaged by a pair of outwardly biased contact members; and FIG. 5 is a fragmentary perspective view illustrating a typical construction of a prior art screen assembly with which the measuring device of the invention can be used.

DETAILED DESCRIPTION OF THE PREFERRED EMBODIMENT

Figure 1:
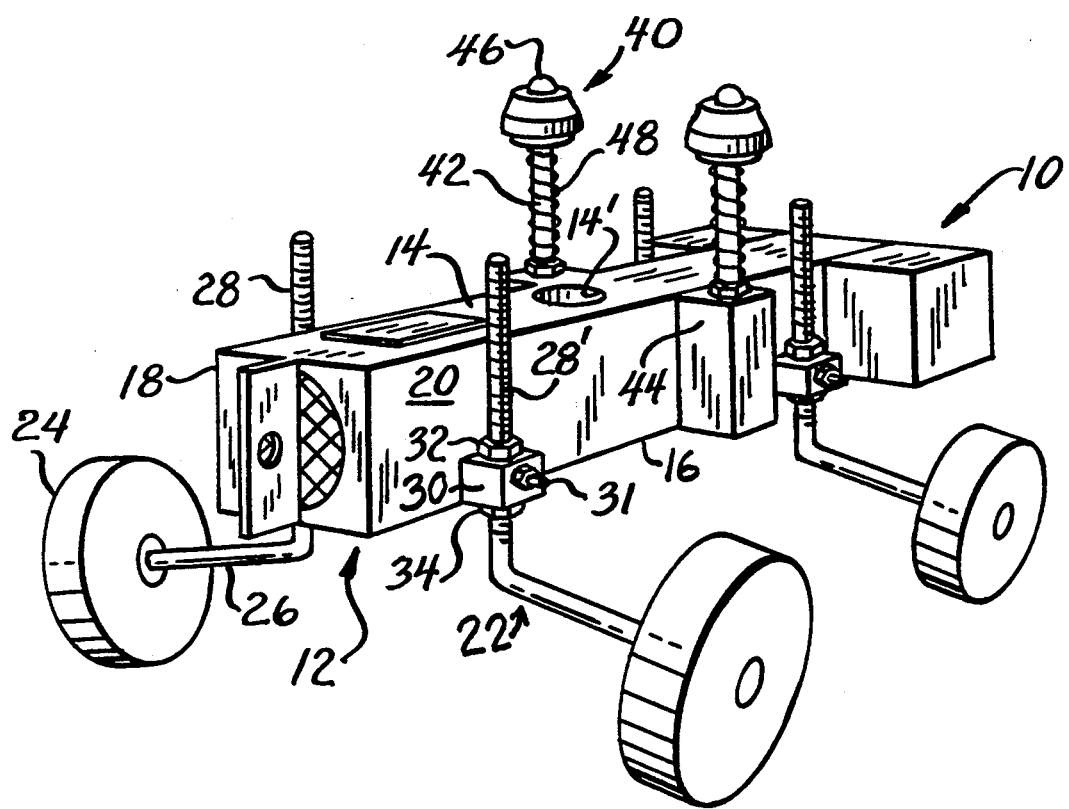
FIG. 1 is a perspective view showing a preferred embodiment of the measuring device of the present invention.

Referring to FIG. 1, a preferred embodiment of the annulus measuring device is illustrated generally at 10. The device is in the form of a cart and includes an elongated body portion or housing 12 having an upper surface 14, and a lower surface 16. Although the cart, when in use, would be suspended vertically in an annulus, as shown in FIG. 4, it will be described, as it is positioned in FIG. 1, as if one were looking at the left front corner of an automobile. Thus, the elongated body portion 12 has a right side surface 18 and a left side surface 20. Mounted on the body portion 12 are four vertically adjustable guide wheel assemblies 22 which each include a guide wheel 24 mounted on an axle 26 which is formed at a small angle relative to the threaded rod member 28 to which it is attached. The threaded rod member 28 has an elongated slot 28' which is adapted to be engaged by a set screw 31 in support flange member 30. The set screw 31' and slot 28' cooperate with each other to prevent rotation of the rod 28 while accommodating its vertical adjustment by means of adjusting nut 32 and locking nut 34. The adjustment feature of the wheel assemblies permits the device 10 to be used to measure a wide range of annular dimensions. A pair of contact members indicated generally at 40 include shaft portions 42 mounted for vertical axial movement in bearing portions 44 located on the side walls 18, 20 of the body portion or housing 12. A contact member 46 in the shape of a ball is mounted for rotational movement at the outer end of the shaft 42 and is preferably made of a low friction material such as PTFE which will not scratch the screen surface with which it is adapted to be engaged. A spring 48 is positioned around the shaft 42 between the contact member 46 and the bearing portion 44 and serves to bias the contact member 46 to its fully extended position. As previously discussed, the force of the spring 48 is carefully selected to ensure that, when the cart 10 is lowered into an annulus, the contact members 40 will exert sufficient force to cause the guide wheels 24 to contact the outer curved surface of an inner screen member, but not enough force to allow the guide wheels to overcome the gravitational forces on the cart and engage the surface of the inner screen with enough pressure as to track it in a non-vertical manner.

FIG. 2 illustrates the tedious prior art technique of taking measurements of an annulus 56 formed between a cylindrical inner screen assembly 58 and a cylindrical outer screen assembly 60. A worker 62 is suspended by a cable 64 in a support harness assembly 66 and progressively lowered inside the inner screen assembly 58 as readings of the annulus width are made at predetermined intervals of about 30 cm. When all of the readings in one vertical line have been made, the worker is raised to the top and then repositioned so that additional sets of readings can be made at predetermined locations such as every 45° around the circumference of the annulus. The measurements are made using a thin ruler 68 which the worker inserts through a slot in the inner screen assembly 58 and then tries to aim at the outer screen assembly 60 so as to contact it along a radius of the screens. Because of the cramped working conditions, it is difficult to keep the ruler aimed in a radial direction so that the most accurate results are obtained.

FIG. 3 is a view looking down into an annulus 56 into which the measuring device 10 shown in FIG. 1 is being lowered by means of a cable 72 attached to its rear end. The view illustrates the curvature of the inner and outer screens and shows the guide wheels 24 straddling the convex surface of the inner screen assembly 58 while the contact members 46 exert a pressure against the concave surface of the outer screen assembly 60. The cables 74 carry electrical signals between the ultrasonic transducers located within the elongated body portion or housing 12 and the controlling equipment located outside the screen assemblies, as best shown at 100 in FIG. 4. The circular opening 76 in the rear surface of the housing 12 is an intake opening for a fan, not shown, located inside the housing. Another fan and intake opening is located at the forward end of the housing. The fans force air past the transducers and improve their performance.

FIG. 4 is a generally schematic vertical view showing the measuring device or cart 10 suspended within an annulus 56 formed between an inner screen assembly 58 and an outer screen assembly 60. The cart 10 is suspended by a cable 72 attached to a bracket 80 attached to the rear end of the elongated housing 12. The cable unwinds from a reel 82 which is mounted on a cable reel assembly 83, and is preferably powered by a gear arrangement and a motor, not shown. The cable reel assembly 83 includes a support bracket 84 which is mounted on an elongated channel 86 which can be adjustably positioned on a frame assembly 88 to allow the reel assembly 83 and reel 82 to be moved in a radial direction to accommodate a range of annulus widths. A pair of downwardly extending U-shaped supports 90 at the ends of the frame assembly 88 are adapted to straddle the upper edge of the outside screen assembly 60 at spaced locations and permit the cable reel assembly 83 to be easily shifted from one circumferential location about the annulus to another. Markers 91 located at predetermined positions along the cable 72 allow the vertical position of the cart within the annulus to be accurately measured and also make it easy to take measurements of the annulus width every time a new marker is encountered. The cart 10 is able to move vertically within the annulus 56 in a manner which ensures that the cambered guide wheels 24 will straddle the convex outer surface 58' of the inner screen assembly 58 since the contact members 40 are lightly spring biased against the surface 61' of the outer screen assembly 60. The force exerted by the springs 48 on the contact members 40 should be just sufficient to maintain a light pressure engagement between the wheels and the surface of the inner screen assembly 58 since too much pressure might allow the wheels to overcome the weight of the cart and track the inner screen assembly in a non-vertical direction. The guide wheels 24, which are preferably made of nylon, or other low friction material, can be adjusted toward or away from the housing 12 by loosening the adjusting nuts 32 and the lock nuts 34 and sliding the threaded rods 28 in an axial direction within the support flange members 30. The threaded rods are prevented from rotating by virtue of the fact that they have longitudinal slots 28' formed in their surfaces which are engaged by the set screws 31 located in the support flange members 30. A pair of ultrasonic transducers 94, 95 are positioned in axial alignment with each other within the housing 12 and are mounted in adjustable mounts, not shown, which permit their exact positions to be precisely controlled in every direction. A plate 96 positioned at a 45° angle to the axis of the transducers 94, 95 serves to reflect the beams 98, 99 radially outwardly through openings 14', 16' formed in in housing surfaces 14, 16 and against the wall surfaces 58', 60', respectively, and then back to their respective transducers. These beams will always be in a radial direction, and thus perpendicular to a tangent to the screen surfaces, due to the straddling contact of the guide wheels 24 with the inner screen surface 58'. When the cart has been lowered to an appropriate location where a reading of the annulus dimension is to be taken, the operator would actuate a switch such as a foot switch, not shown, to cause the distance measured by each transducer to be transmitted through cables 74 to the controller box 100 where the readings are summed to provide a reading of the total annulus width which is indicated on a numeric display 102 on the controller box 100. Simultaneously, the data is fed to a "DataMyte" recorder 104 which stores it and processes it for later transmittal to a computer program for printing it out in a desired format. The beam 98 which emanates from transducer 94 comprises the segments A-B, B-C and C-D, whereas the beam 99 which emanates from transducer 95 comprises the segments A'-B', B'-C' and C'-D'. As previously discussed, flat plates may be temporarily placed over the openings 14', 16' to calibrate the device so that the distance readings provided by the unit when the plates are in place flush with the surfaces 14, 16 will exactly equal the known distance C-C' between the surfaces 14 and 16. This distance, added to the distances C-D and C'-D' in the controller box 100, will thus equal the radial distance D-D' between the inner and outer surfaces 58',60' of the annulus. Since the screens are curved, the location of point D on screen surface 58' appears to be closer to the center of the annulus in FIG. 4 then the location of the contact point between the guide wheels 24 and the screen surface but is actually at the same radial distance. Similarly, the location of point D' on outer screen surface 60' appears to be further out than the location of the point of contact between the pair of spaced contact ball portions 46 and the concave inner wall of the outer screen surface.

FIG. 5 shows a screen assembly 106 which is disclosed in U.S. Pat. No. 4,276,265 and which is typical of the type used in reactors with which the present measuring device might be used. It comprises a pair of inner and outer screens assemblies 158, 160, respectively, having an annulus 156 between them and illustrates that the screen surfaces 158', 160' which, during use as a reactor, would contain a bed of catalyst 110, are each formed of vertically extending wires 112 which are welded to circumferentially extending channel portions 114. Gases to be treated would typically enter through openings 116 in the outer screen assembly 160, pass through the catalyst bed 110 in the annulus 156 and exit through openings 118 in the inner screen assembly 158.

We claim:

1. A measuring device for measuring, at a plurality of circumferentially spaced locations, the radial thickness of an annulus defined by the curved outer wall surface of a first generally cylindrical, tubular-shaped member which has its axis positioned vertically, and the curved inner wall surface of a second generally cylindrical, tubular-shaped member which is generally concentrically located outside said first tubular-shaped member, said measuring device having an elongated body portion which has means on at least one end thereof which is adapted to be engaged by a flexible lowering and lifting means so that said measuring device may be lowered freely under its own weight or raised within said annulus so as to measure the radial thickness of said annulus at any point along its length or around its circumference, said elongated body portion having at least two axially spaced-apart sets of guide means extending from a first surface thereof which are adapted to guide said body portion for vertical movement relative to one of said curved outer and inner wall surfaces and parallel to the axes of said first and second tubular-shaped members, each of said at least two axially spaced-apart sets of guide means having a pair of transversely spaced contact surfaces shaped and positioned so as to be tangential to the said one of said curved outer and inner wall surfaces, said elongated body portion further having at least one contact portion which extends from a second surface of said body portion which is opposed to said first surface, said at least one contact portion being adapted to engage the other of said outer and inner wall surfaces, means for resiliently biasing apart said at least one contact portion and said at least two axially spaced-apart sets of guide means relative to each other with sufficient force to simultaneously engage both of the curved outer and inner wall surfaces which define the annulus, but with insufficient force to allow the said at least two axially spaced-apart sets of guide means to engage and track the wall surface with which they are in contact so as to cause movement in a non-vertical direction which would overcome the vertical gravitational force produced by the weight of the measuring device, means on said elongated body portion for generating and directing a pair of sensing beams in opposed coaxial directions outwardly relative to said first and second surfaces of said body portion and into contact with said inner and outer wall surfaces in a direction normal thereto, said two axially spaced-apart sets of guide means serving to maintain a predetermined angular position of said measuring device relative to said curved outer and inner wall surfaces and thereby causing said pair of sensing beams to be directed toward said curved outer and inner wall surfaces in a direction normal thereto, and means to sense the time it takes for said pair of sensing beams to contact said outer and inner wall surfaces and to be reflected back to their source whereby the radial thickness of said annulus may be calculated.

2. A measuring device in accordance with claim 1 wherein each of said axially spaced-apart set of guide means comprises a pair of wheels mounted for rotation on a pair of axles.

3. A measuring device in accordance with claim 2 wherein said pairs of wheels and the axles on which they are mounted for rotation are adjustably mounted for movement toward and away from said first surface of said body portion so as to permit said measuring device to measure a substantial range of annular dimensions.

4. A measuring device in accordance with claim 2 wherein said pairs of axles are positioned at an angle to each other so as to cause the contact surface of the wheels to be at least generally tangential to the curved surface of the inner tubular member.

5. A measuring device in accordance with claim 1 wherein said lowering and lifting means is in the form of a cable attached to said means on at least one end of said elongated body portion.

6. A measuring device in accordance with claim 5 wherein said cable has markings along its length.

7. A measuring device in accordance with claim 1 wherein said at least one contact portion is positioned at the outer end of a movable shaft which is mounted in beatings supported by said body portion.

8. A measuring device in accordance with claim 7 wherein said means for resiliently biasing apart said at least one contact portion and said at least two axially spaced-apart sets of guide means is a spring means.

9. A measuring device in accordance with claim 8 wherein said at least one contact portion is a freely rotating ball made of low friction material.

10. A measuring device in accordance with claim 9 wherein a pair of contact portions and a pair of shafts to support them are mounted on said body portion.

11. A measuring device in accordance with claim 1 wherein said means for generating and directing a pair of sensing beams in opposed directions comprises a pair of ultrasonic transducers mounted internally of said body portion near opposite ends thereof, and reflecting plate means positioned internally of said elongated body portion for directing said sensing beams radially outwardly towards said outer and inner wall surfaces.

12. A measuring device in accordance with claim 11 wherein said reflecting plate means is positioned intermediate said pair of sensing beams and at a 45° angle to the axis of said elongated body portion.

* * * * *